US012643759B2

(12) United States Patent
Yokawa et al.

(10) Patent No.: US 12,643,759 B2
(45) Date of Patent: Jun. 2, 2026

(54) PAPER SHEET STORING DEVICE

(71) Applicant: Glory Ltd., Himeji (JP)

(72) Inventors: Takeshi Yokawa, Himeji (JP); Hiroyuki Yanai, Himeji (JP)

(73) Assignee: GLORY LTD., Himeji (JP)

( * ) Notice: Subject to any disclaimer, the term of this patent is extended or adjusted under 35 U.S.C. 154(b) by 199 days.

(21) Appl. No.: 18/402,780

(22) Filed: Jan. 3, 2024

(65) Prior Publication Data

US 2024/0132318 A1 Apr. 25, 2024
US 2024/0228215 A9 Jul. 11, 2024

Related U.S. Application Data

(63) Continuation of application No. PCT/JP2022/027414, filed on Jul. 12, 2022.

(30) Foreign Application Priority Data

Jul. 14, 2021 (JP) ................................ 2021-116370

(51) Int. Cl.
*B65H 29/00* (2006.01)
*G07D 11/12* (2019.01)

(52) U.S. Cl.
CPC ........... *B65H 29/006* (2013.01); *G07D 11/12* (2019.01); *B65H 2301/4191* (2013.01); *B65H 2701/1912* (2013.01); *G07D 2211/00* (2013.01)

(58) Field of Classification Search
CPC .............................. B65H 29/006; G07D 11/12
See application file for complete search history.

(56) References Cited

U.S. PATENT DOCUMENTS

2002/0096818 A1* 7/2002 Mochizuki ........... B65H 29/006 271/18
2012/0313493 A1* 12/2012 Yokote ................. B65H 29/006 271/10.09
2012/0326384 A1 12/2012 Arikata et al.
2016/0023856 A1 1/2016 Arikata et al.
2016/0335829 A1 11/2016 Takada et al.
2017/0355543 A1 12/2017 Arikata et al.
2018/0137713 A1* 5/2018 Kuroda .................. G07D 11/18
(Continued)

FOREIGN PATENT DOCUMENTS

JP 2004-030348 A 1/2004
JP 2006-069708 A 3/2006
(Continued)

OTHER PUBLICATIONS

Machine translation WO2018211939A1 (Year: 2018).*
(Continued)

*Primary Examiner* — Abbas Rashid
*Assistant Examiner* — Wayne K. Swier
(74) *Attorney, Agent, or Firm* — XSENSUS LLP

(57) ABSTRACT

A sheet storing device includes: a rotary drum; at least one tape that wraps a sheet around the rotary drum; and at least one first pressing member that is shifted from the tape along an axis of the rotary drum and presses the sheet against the outer circumferential surface of the rotary drum. The first pressing member presses the sheet against the rotary drum at or near a starting point at which the tape to be wound on the rotary drum first comes into contact with the rotary drum.

12 Claims, 10 Drawing Sheets

(56) References Cited

U.S. PATENT DOCUMENTS

| | | | |
|---|---|---|---|
| 2018/0350181 | A1 | 12/2018 | Li et al. |
| 2019/0073853 | A1 | 3/2019 | Shimamura et al. |
| 2022/0081246 | A1 | 3/2022 | Kondou et al. |

FOREIGN PATENT DOCUMENTS

| | | | | | |
|---|---|---|---|---|---|
| JP | 2013-008341 | A | | 1/2013 | |
| JP | 2015-146167 | A | | 8/2015 | |
| JP | 2018-072859 | A | | 5/2018 | |
| JP | 2019-101676 | A | | 6/2019 | |
| JP | 2020-194417 | A | | 12/2020 | |
| WO | 2017/203714 | A1 | | 11/2017 | |
| WO | WO-2018211939 | A1 | * | 11/2018 | ........... B65H 29/006 |

OTHER PUBLICATIONS

International Search Report and Written Opinion mailed on Sep. 13, 2022, received for PCT Application PCT/JP2022/027414, filed on Jul. 12, 2022, 9 pages including English Translation.

* cited by examiner

PAPER SHEET STORING DEVICE

CROSS-REFERENCE TO RELATED APPLICATIONS

This application is a bypass continuation of International Patent Cooperation Treaty Application No. PCT/JP2022/027414 filed on Jul. 12, 2022, and claims priority to Japanese Patent Application No. 2021-116370 filed on Jul. 14, 2021, the entire disclosures of each are incorporated herein by reference.

BACKGROUND

A conventional banknote storing device includes a drum and a guide. Banknotes are wrapped around the outer circumferential surface of the drum, together with tapes. The guide guides the tapes and banknotes to the drum. The guide swings in accordance with the outer diameter of the drum. The "outer diameter" of the drum herein is a winding diameter including the tapes and the banknotes wound on the drum.

A roller that comes into contact with the banknotes wound on the drum is attached to the guide. The roller is interposed between two tapes aligned along the axis of rotation of the drum. The roller comes into contact with the banknotes, whereby the guide swings. The roller also presses the banknotes against the drum. Accordingly, the roller presses the bulge of the central portion of each banknote wound on the drum.

SUMMARY

The technique disclosed herein relates to a sheet storing device. This sheet storing device includes: a rotary drum; at least one tape to be wound on an outer circumferential surface of the rotary drum so as to wrap a sheet around the rotary drum; and at least one first pressing member that is shifted from the tape along the axis of the rotary drum and presses the sheet against the outer circumferential surface of the rotary drum. The first pressing member presses the sheet against the rotary drum at or near a starting point at which the tape to be wound on the rotary drum first comes into contact with the rotary drum.

DETAILED DESCRIPTION OF THE DRAWINGS

Figure 1:
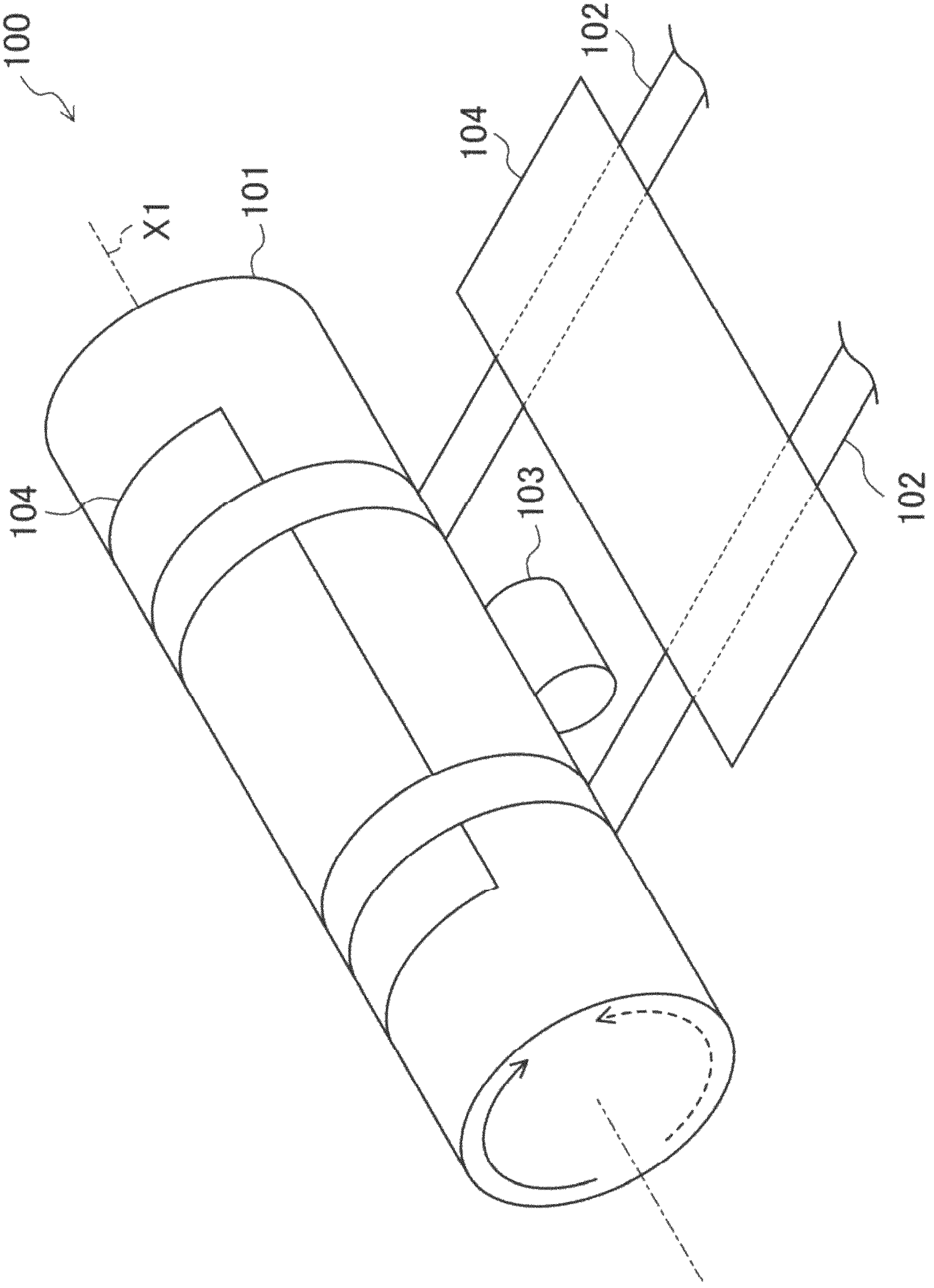
FIG. 1 shows a first configuration of a sheet storing device.

In a conventional banknote storing device, a roller is attached near a distal end of the guide. The roller presses, against a drum, banknotes after being wound on the outer circumferential surface of the drum. If two tapes press both ends of each banknote with a strong force, the roller may have difficulty in correcting the bulge of the central portion of the banknote even when pressing the central portion against the drum. The conventional banknote storing device may cause a defect of the drum having a raised crown shape after winding banknotes.

A conventional banknote storing device, which presses the central portion of each banknote with one tape, causes bulges of the banknote on both sides of the tape, which may lead to a defect of a drum having a recessed crown shape after winding banknotes.

The technique disclosed herein reduces the bulges of a sheet wound on a drum.

The technique disclosed herein relates to a sheet storing device. This sheet storing device includes: a rotary drum; at least one tape to be wound on an outer circumferential surface of the rotary drum so as to wrap a sheet around the rotary drum; and at least one first pressing member that is shifted from the tape along the axis of the rotary drum and presses the sheet against the outer circumferential surface of the rotary drum. The "axis" is an imaginary axis of rotation of the rotary drum. The first pressing member presses the sheet against the rotary drum at or near a starting point at which the tape to be wound on the rotary drum first comes into contact with the rotary drum. The point at which the first pressing member presses the sheet against the rotary drum may be said to be at or near the starting point in the running direction of the tape. The point at which the first pressing member presses the sheet against the rotary drum may also be said to be at or near the starting point along the circumference of the rotary drum. The point at which the first pressing member presses the sheet against the rotary drum may also be said to be at or near the starting point as viewed along the axis of the rotary drum.

The first pressing member presses the sheet against the rotary drum at a proper point, which reduces the bulge of the sheet wound on the drum.

The first pressing member may press the sheet against the rotary drum at the starting point or at a point upstream of the starting point in a running direction of the tape being wound on the rotary drum.

The first pressing member presses the sheet against the rotary drum before the tape presses the sheet, which reduces the bulge of the sheet in advance.

At least when a first sheet is wound on the rotary drum, the first pressing member may press the first sheet against the rotary drum at or near the starting point.

At a smaller diameter of the rotary drum, the first pressing member can reduce the bulge of the sheet wound on the drum. The "diameter of the drum" herein is the winding diameter including the tape and banknote(s) wound on the drum.

The first pressing member may press the sheet against the rotary drum at a point downstream of the starting point in the running direction of the tape being wound on the rotary drum with the predetermined number or more of sheets wound on the rotary drum.

The tape may include: a first tape; and a second tape to be wound on the outer circumferential surface of the rotary drum with a shift from the first tape along the axis. The first pressing member may be interposed between the first tape and the second tape aligned along the axis.

The first pressing member can press, against the rotary drum, the portion of the sheet which is not pressed by the tape.

The first pressing member includes a plurality of first pressing members, and the plurality of first pressing members may be interposed between the first tape and the second tape aligned along the axis.

The first pressing member may be located more outward than the tape along the axis on the rotary drum.

The first pressing member can press, against the rotary drum, the portion of the sheet which is not pressed by the tape.

The first pressing member may be a roller that comes into contact with the outer circumferential surface of the rotary drum and is to be rotated by the rotary drum.

The rotating roller reduces the resistance to the rotation of the rotary drum.

The sheet storing device may further include: a movable guide that is displaced in accordance with a change in a diameter of the rotary drum and guides, to the rotary drum, the tape and the sheet to be wound on the rotary drum. The movable guide may support the first pressing member.

Even with a change in the diameter of the rotary drum, the movable guide can press the first pressing member against the rotary drum.

The movable guide may support the first pressing member to be displaceable with respect to the movable guide.

The first pressing member displaceable with respect to the movable guide can press the sheet against the rotary drum more effectively.

The sheet storing device may further include: a first swing member swingably attached to the movable guide. The first swing member may support the first pressing member.

The sheet storing device may further include: a movable guide that swings in accordance with a change in a diameter of the rotary drum and guides the tape and the sheet to be wound on the rotary drum; and a second swing member that swings in a direction toward and away from the rotary drum independently of the movable guide. The second swing member may support the first pressing member.

The sheet storing device may further include: a second pressing member that presses, against the rotary drum, the tape wound on the rotary drum.

The second pressing member increases the adhesion between the tape and the sheet. The rotary drum can stably wind the tape and the sheet.

The first pressing member and the second pressing member may be shifted from each other along a circumference of the rotary drum.

The first and second pressing members can each press the sheet and the tape against the rotary drum properly.

The movable guide may support the second pressing member.

An embodiment of a sheet storing device will be described in detail below with reference to the drawings. The sheet storing device described herein is an example.

(First Configuration)

FIG. 1 illustrates a sheet storing device 100 with a first configuration. FIG. 1 shows an internal configuration of the sheet storing device 100. The sheet storing device 100 includes a rotary drum 101, two tapes 102 including first and second tapes, and a pressing member (first pressing member) 103.

The rotary drum 101 rotates about an axis X1 (i.e., axis X1 of rotation). Rotating in a forward direction indicated by the solid arrow in FIG. 1, the rotary drum 101 winds sheets 104 on the outer circumferential surface thereof. Rotating in a reverse direction indicated by the broken arrow in FIG. 1, the rotary drum 101 feeds out the sheets 104. Examples of the sheets 104 include banknotes, checks, vouchers, or securities. With no sheet 104 wound thereon, the rotary drum 101 has a relatively small outer diameter. The rotary drum 101, which has a small outer diameter when no sheet 104 is wound thereon, can wind a large number of sheets 104. That is, the sheet storing device 100 has a large capacity.

The tapes 102 are flexible and wound on the outer circumferential surface of the rotary drum 101 once the rotary drum 101 rotates. The two tapes 102 are spaced apart from each other along the axis X1 of rotation. The two tapes 102 each abut on an end of each elongated sheet 104 and wrap the sheet 104 around the rotary drum 101.

Note that the number of tapes is not limited to two. The sheet storing device may include one tape. The one tape abuts on the central portion of each sheet 104 and wraps the sheet 104 around the rotary drum 101. The sheet storing device may include three tapes. Two of the three tapes each abut on an end of each sheet 104 and wrap the sheet 104 around the rotary drum 101. The remaining one of the three tapes abuts on the central portion of the sheet 104 and wraps the sheet 104 around the rotary drum 101. The one tape may be interposed between the sheet 104 and the rotary drum 101. The sheet storing device may include four tapes. Two of the four tapes may sandwich each sheet 104 along the thickness at a first end of the sheet 104. The remaining two tapes may sandwich the sheet 104 along the thickness at a second end of the sheet 104.

The pressing member 103 presses the sheet 104 to be wound on the rotary drum 101, against the outer circumferential surface of the rotary drum 101. The pressing member 103 with the first configuration is a rotary roller. The axis of rotation of the rotary roller is parallel to the axis X1 of rotation of the rotary drum 101. The pressing member 103 abuts on the outer circumferential surface of the rotary drum 101. The pressing member 103 rotates in accordance with the rotation of the rotary drum 101. The rotary roller reduces the rotational resistance of the rotary drum 101. The pressing member 103 is not limited to a roller. The pressing member 103 may be any member that functions to press the sheet 104 against the outer circumferential surface of the rotary drum 101.

Figure 2A:
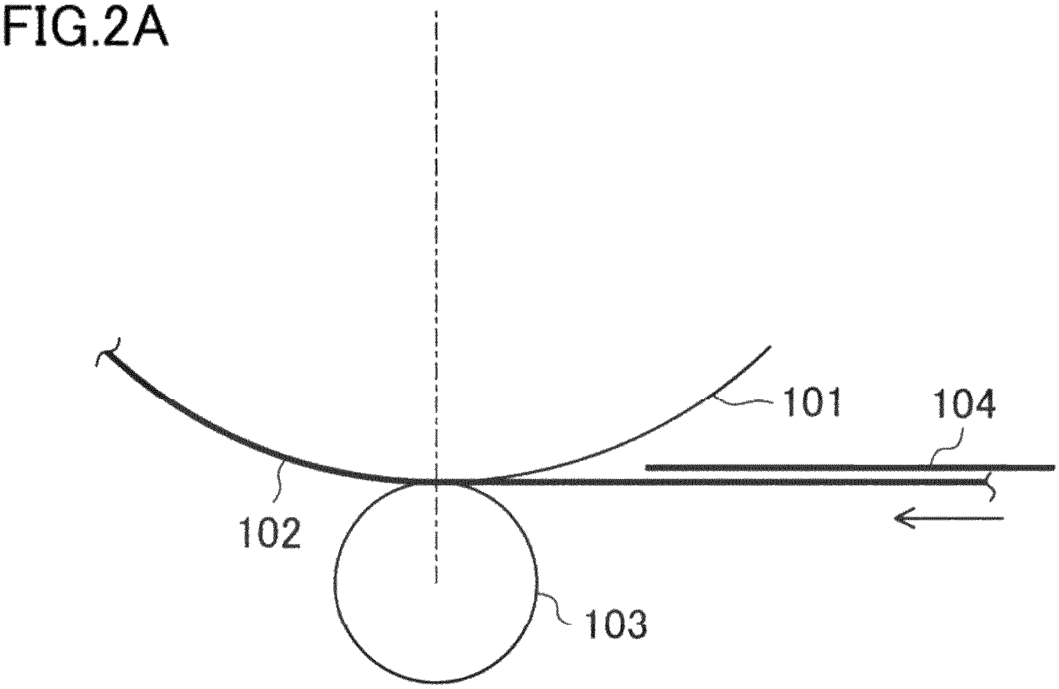
FIGS. 2A and 2B each show the position of a pressing member in the sheet storing device with the first configuration.

The pressing member 103 is interposed between the two tapes 102 of the first and second tapes. The pressing member 103 presses the central portion of each sheet 104 against the rotary drum 101. FIG. 2 illustrates the position of the pressing member 103 in the running direction of the tapes 102. In FIG. 2A shows an example where the pressing member 103 is located at a starting point at which each tape 102 to be wound on the rotary drum 101 first comes into contact with the rotary drum 101 (see the dot-dashed line in FIG. 2A). The sheet 104 wound on the rotary drum 101 together with the tape 102 is curved along the outer circumferential surface of the rotary drum 101. The pressing member 103 can press, against the rotary drum 101, a portion of the sheet 104 which is not pressed by the tape 102. This reduces the bulge of the portion of the sheet 104, which is not pressed by the tape 102, in the direction away from the rotary drum 101.

The bulge of a sheet 104 becomes a problem when a smaller number of sheets 104 are wound on the rotary drum 101. With a smaller number of sheets 104 wound thereon, the rotary drum 101 has a smaller outer diameter. The rotary drum 101 with a smaller outer diameter tends to cause a bulge of a portion of the sheet 104 which is not pressed by the tape 102, unless the sheet 104 is curved strongly. If the sheet 104 wound on the rotary drum 101 bulges, as the number of sheets 104 wound on the rotary drum 101 increases, the sheets 104 are stacked on the bulging sheet 104. This results in, for example, a deformation of the rotary drum 101 into a raised crown shape.

In particular, the pressing member 103 can press, against the rotary drum 101, the front and rear ends of each sheet 104 advancing toward the rotary drum 101. As a result, even when a smaller number of sheets 104 are wound on the rotary drum 101, in other words, even when the rotary drum 101 has a smaller diameter, the sheets 104 are curved strongly along the outer circumferential surface of the rotary drum 101. This reduces the bulge of the portion of the sheet 104 which is not pressed by the tapes 102.

The pressing member 103 may always press each sheet 104 against the rotary drum 101 regardless of the number of sheets 104 wound on the rotary drum 101. However, as the number of sheets 104 wound on the rotary drum 101 increases, the outer diameter of the rotary drum 101 increases. Since each sheet 104 is curved at a small curvature, it is less likely to bulge.

The pressing member 103 may thus reduce the bulge of each sheet 104, when the number of sheets 104 wound on the rotary drum 101 is small. At least when the first sheet 104 is wound on the rotary drum 101, the pressing member 103 may press the first sheet 104 against the rotary drum 101. The reduction in the bulge of the first sheet 104 leads to effective reduction in the deformation of the rotary drum 101 into the crown shape, when the number of sheets 104 wound on the rotary drum 101 increases.

Figure 2B:
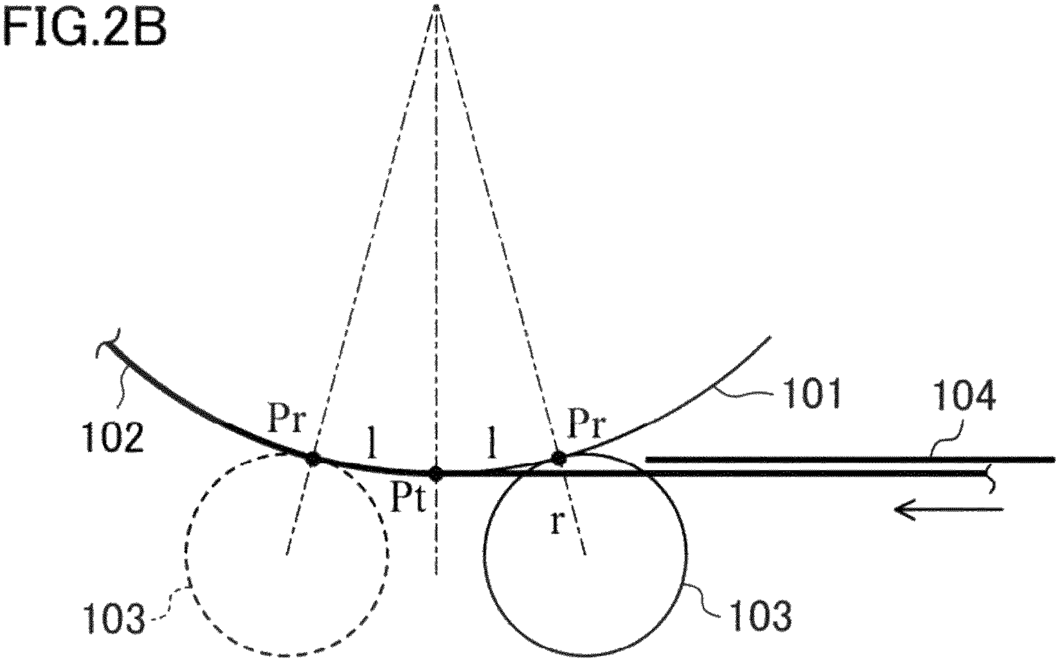

FIG. 2B shows a variation of the position of the pressing member 103. The pressing member 103 is located upstream of the starting point, at which each tape 102 to be wound on the rotary drum 101 first comes into contact with the rotary drum 101, in the running direction of the tape 102. At this point, each sheet 104 is not sandwiched between the tape 102 and the rotary drum 101. The press of the sheet 104 against the rotary drum 101 by the pressing member 103 reduces the bulge of the sheet 104 effectively.

If the pressing member 103 is far away from the starting point toward the upstream end, the distance between the position of the pressing member 103 and the starting point in the running direction of the tape 102 increases. The starting point is a point at which each tape 102 first comes into contact with the rotary drum 101. This results in a larger section in which the distal end of the sheet 104 is not pressed against the rotary drum 101 by the pressing member 103 immediately before being sandwiched between the tape 102 and the rotary drum 101. This may hinder the stable winding of the sheet 104 on the rotary drum 101. The pressing member 103 is preferably located near the starting point.

The pressing member 103 may be located downstream of the starting point in the running direction of each tape 102 to be wound on the rotary drum 101, as long as being located near the starting point. The pressing member 103 far away from the starting point toward the downstream end may have already caused a bulge of a sheet 104 pressed by the tapes 102. Since the tapes 102 strongly press the sheet 104 against the rotary drum 101, the bulge cannot be corrected even by the pressing member 103 pressing the sheet 104.

On the other hand, the sheet 104 is not yet strongly pressed by the tapes 102 near the starting points. Even if the sheet 104 has already bulged, the bulge can be corrected by the pressing member 103 pressing the sheet 104 against the rotary drum 101.

Therefore, the pressing member 103 presses the sheet 104 against the rotary drum 101 at or near the starting point.

If the first sheet 104 is wound on the rotary drum 101, Pt represents the starting point at which each tape 102 first comes into contact with the rotary drum 101, Pr represents the point at which the pressing member 103 comes into contact with the rotary drum 101, and l represents the length of the arc between Pr and Pt. The pressing member 103 near the starting point means that the arc length l is smaller than or equal to a predetermined length L. L may be an experimentally determined value. L is 10 mm, for example. L may be 2r if the pressing member 103 is a rotary roller with a radius r. L may be equal to r. As the radius of the rotary roller as the pressing member 103 is larger, the wider the position of the pressing member 103 can be selected from a wider area.

FIG. 3 shows arrangement examples of a pressing member(s) 103 with respect to the axis X1 of rotation of the rotary drum 101. In FIG. 3A, one pressing member 103 is interposed between two tapes 102 of first and second tapes 102. The pressing member 103 can reduce the bulge of each sheet 104 between the two tapes 102 effectively.

Figure 3A:
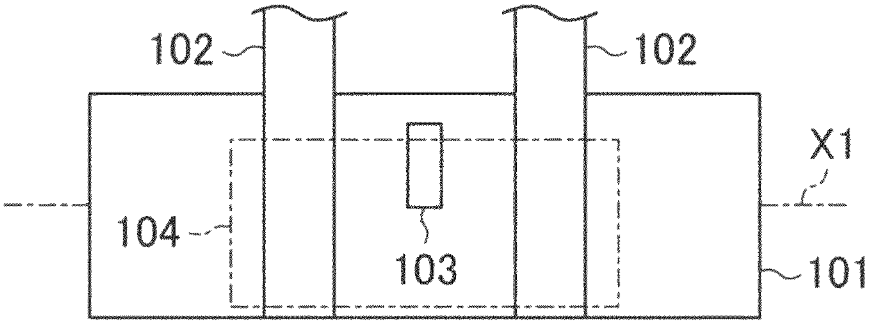
FIGS. 3A, 3B, 3C, and 3D each show the position(s) of a pressing member(s) in the sheet storing device with the first configuration.
Figure 3B:
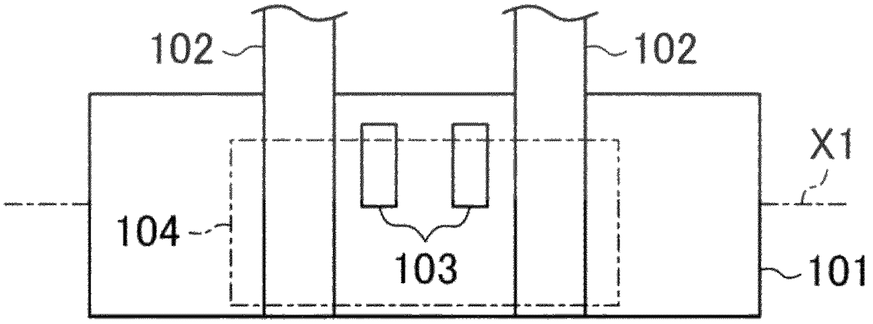

In FIG. 3B, two pressing members 103 are interposed between two tapes 102. The two pressing members 103 are aligned along the axis X1 of rotation. The plurality of pressing members 103 can reduce the bulge of each sheet 104 more effectively. Note that the number of the pressing members 103 interposed between the tapes 102 may be three or more.

Figure 3C:
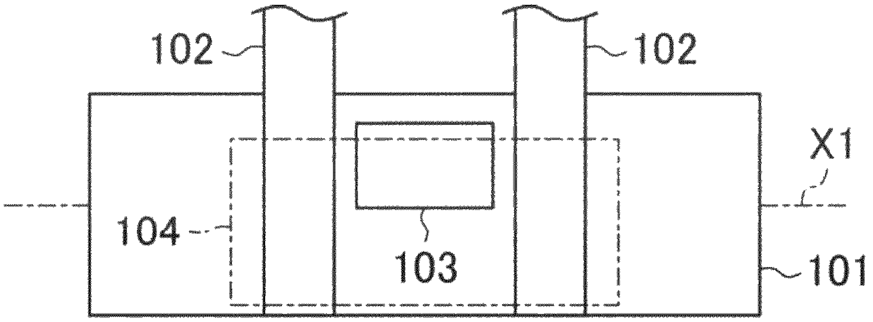

In FIG. 3C, a pressing member 103 extends long along the axis X1 of rotation. The pressing member 103 can press the sheets 104 against the rotary drum 101 over a wide area between the two tapes 102.

Figure 3D:
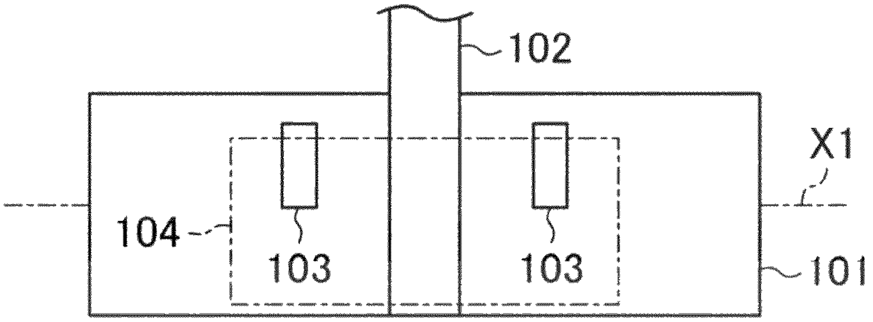

In FIG. 3D, a pressing member 103 is located more outward than a tape 102 in the direction of the axis X1 of rotation on the rotary drum 101. In particular, the example of FIG. 3D shows one tape 102, and two pressing members 103 on both sides of the tape 102. The number of tapes 102 is not limited to one. Two pressing members 103 press both ends of each sheet 104 against the rotary drum 101. If there is one tape 102, both ends of each sheet 104 bulge, which may result in deformation of the rotary drum 101 into a recessed crown shape. The configuration example of FIG. 3D can reduce the deformation of the rotary drum 101 into a recessed crown shape effectively.

Note that the configurations shown in FIGS. 3A, 3B, 3C, and 3D can be combined as appropriate.

(Second Configuration)

Figure 4:
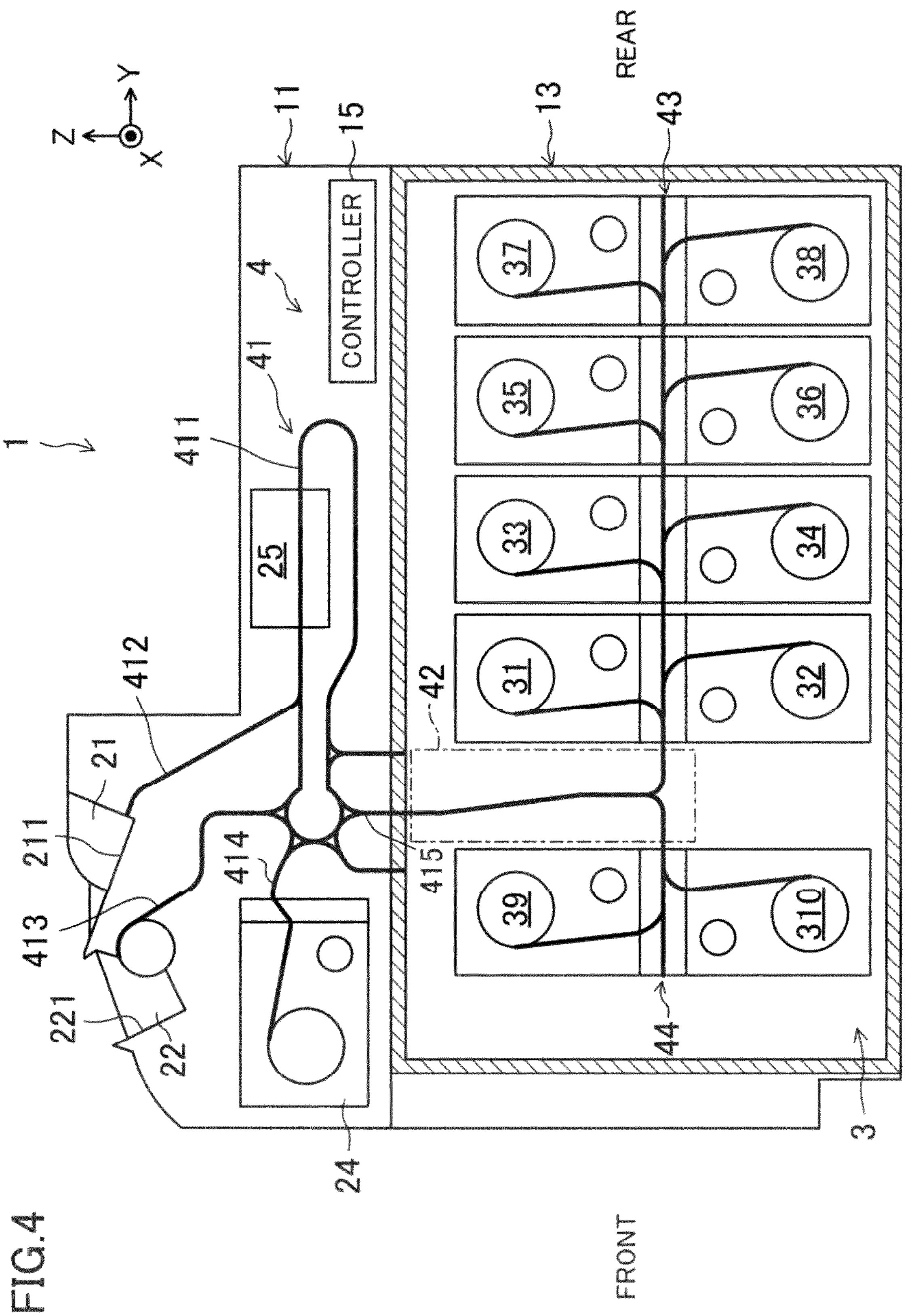
FIG. 4 shows a sheet handling apparatus including a sheet storing device with a second configuration.

FIG. 4 shows a sheet handling apparatus including a sheet storing device with a second configuration. The sheet storing device with the second configuration is a variation of the sheet storing device 100 with the first configuration.

(General Configuration of Sheet Handling Apparatus)

The sheet handling apparatus is installed in, for example, a financial institution such as a bank. The sheet handling apparatus is a banknote handling apparatus 1 that handles loose notes. The banknote handling apparatus 1 is installed in, for example, a teller counter in a bank. The banknote handling apparatus 1 performs various processes including a depositing process and a dispensing process. Note that the banknote handling apparatus 1 may be installed and used in, for example, a back office of a retail store, in addition to a financial institution.

The banknote handling apparatus 1 has an elongated shape in a front-rear direction. A front of the banknote handling apparatus 1 refers to a portion where an inlet 211 and an outlet 221, which will be described later, are formed. A rear of the banknote handling apparatus 1 refers to a portion opposite to the portion where the inlet 211 and the outlet 221 are formed. A right-left direction of the banknote handling apparatus 1 is a direction orthogonal to the front-rear direction. The left of the banknote handling apparatus 1 corresponds to the left when facing the front of the banknote handling apparatus 1, while the right of the banknote handling apparatus 1 corresponds to the right when facing the front of the banknote handling apparatus 1.

For easier understanding, the X-axis, the Y-axis, and the Z-axis are shown in each drawing with an X-axis positive direction extending from the left to the right, a Y-axis positive direction extending from the front to the rear, and a Z-axis positive direction extending from the bottom to the top.

The banknote handling apparatus 1 includes an upper handling unit 11 and a lower safe unit 13. A depositing unit 21, a dispensing unit 22, a temporary storage unit 24, a recognition unit 25, and an upper transport unit 41 are disposed in the handling unit 11. The upper transport unit 41 is a part of a transport unit 4. A plurality of storing devices 31 to 310, a first lower transport unit 42, a second lower transport unit 43, and a third lower transport unit 44 are disposed in the safe unit 13. The first, second, and third lower transport units 42, 43, and 44 are a part of the transport unit 4.

The depositing unit 21 is a portion of the apparatus into which the banknotes to be deposited are inserted, for example, in a depositing process. The depositing unit 21 has the inlet 211. The inlet 211 opens upward at a front portion of an upper housing 111. The operator manually inserts one or more banknotes into the depositing unit 21 through the inlet 211. The depositing unit 21 has a mechanism that transmits the banknotes one by one into the banknote handling apparatus 1.

The dispensing unit 22 is a portion of the apparatus to which the banknotes fed from the storing devices 31 to 310 are transported, for example, in a dispensing process. The dispensing unit 22 has the outlet 221. The outlet 221 opens upward at a position closer to the front than the inlet 211. The operator can manually remove the banknotes stacked in the dispensing unit 22 through the outlet 221.

The temporary storage unit 24 temporarily stores the banknotes to be deposited, for example, in the depositing process. The temporary storage unit 24 can feed the stored banknotes. The temporary storage unit 24 is a tape-winding storing device. The temporary storage unit 24 stores the banknotes by wrapping them around the drum, together with the tapes. The tape-winding storing device has the advantage of causing less change in the order of the banknotes being stored and fed. The tape-winding storing device also has the advantage of allowing for the storage of various sizes of banknotes in a mixed manner. A known configuration of the tape-winding storing device may be employed as the temporary storage unit 24. The temporary storage unit 24 may have the same configuration as the storing devices 31 to 310.

The recognition unit 25 is disposed in a first transport path 411 that will be described later. The recognition unit 25 recognizes at least whether each banknote being transported through the first transport path 411 is authentic or not, a denomination of each banknote, or whether each banknote is fit or unfit. The recognition unit 25 further acquires a serial number of each of the banknotes.

The banknote handling apparatus 1 includes a first storing device 31, a second storing device 32, a third storing device 33, a fourth storing device 34, a fifth storing device 35, a sixth storing device 36, a seventh storing device 37, an eighth storing device 38, a ninth storing device 39, and a tenth storing device 310. These storing devices are aligned in the front-rear direction and vertically overlap with each other in the safe unit 13. The first to tenth storing devices 31 to 310 constitute a storage unit 3.

The first to tenth storing devices 31 to 310 are tape-winding storing devices. The details of the configurations of the first to tenth storing devices 31 to 310 will be described later. The first to tenth storing devices 31 to 310 may store banknotes of different denominations, for example.

The transport unit 4 transports the banknotes one by one at intervals in the banknote handling apparatus 1. The transport unit 4 has a transport path. The transport path includes a combination of a large number of rollers, a plurality of belts, a motor for driving the rollers, and a plurality of guides. The transport unit 4 transports the banknotes, for example, with their long edges facing forward. The transport unit 4 may transport the banknotes with their short edges facing forward.

The transport unit 4 includes the upper transport unit 41, the first lower transport unit 42, the second lower transport unit 43, and the third lower transport unit 44. As described above, the upper transport unit 41 is disposed in the handling unit 11. The first lower transport unit 42, the second lower transport unit 43, and the third lower transport unit 44 are disposed in the safe unit 13. The upper transport unit 41 and the first lower transport unit 42 are connected to each other via a transport path in a wall separating the handling unit 11 from the safe unit 13.

The upper transport unit 41 includes a first transport path 411 in a loop shape. The transport unit 4 transports the banknotes along the first transport path 411 in a clockwise direction (i.e., forward) and the counterclockwise direction (i.e., backward) in FIG. 4. The first transport path 411 circulates the banknotes.

The upper transport unit 41 further includes a second transport path 412, a third transport path 413, a fourth transport path 414, a fifth transport path 415.

The second transport path 412 connects the depositing unit 21 and the first transport path 411 together. The second transport path 412 transports the banknotes from the depositing unit 21 toward the first transport path 411.

The third transport path 413 connects the dispensing unit 22 and the first transport path 411 together. The third transport path 413 transports the banknotes from the first transport path 411 toward the dispensing unit 22. A junction between the third transport path 413 and the first transport path 411 is provided with a diverter for changing the destination of the banknotes.

The fourth transport path 414 connects the temporary storage unit 24 and the first transport path 411 together. The fourth transport path 414 transports the banknotes from the first transport path 411 toward the temporary storage unit 24 and from the temporary storage unit 24 toward the first transport path 411. A junction between the fourth transport path 414 and the first transport path 411 is provided with a diverter.

The fifth transport path 415 connects the first lower transport unit 42 and the first transport path 411 together. The fifth transport path 415 transports the banknotes from the first transport path 411 toward the first lower transport unit 42 and from the first lower transport unit 42 toward the first transport path 411. A junction between the fifth transport path 415 and the first transport path 411 is provided with a diverter.

The first lower transport unit 42 is interposed between the first storing device 31 and the ninth storing device 39. The first lower transport unit 42 connects the fifth transport path 415, the second lower transport unit 43, and the third lower transport unit 44 together.

The second lower transport unit 43 is interposed between the first, third, fifth, and seventh storing devices 31, 33, 35, and 37 and the second, fourth, sixth, and eighth storing devices 32, 34, 36, and 38. The first to eighth storing devices 31 to 38 each have a diverter. Each diverter draws the banknotes transported by the second lower transport unit 43 into the corresponding storing devices. In addition, each diverter feeds the banknotes fed out from the corresponding storing devices to the second lower transport unit 43.

The third lower transport unit 44 is interposed between the ninth storing device 39 and the tenth storing device 310. The ninth and tenth storing devices 39 and 310 each have a diverter. Each diverter draws the banknotes transported by the third lower transport unit 44 into the corresponding storing device. In addition, each diverter feeds the banknotes fed out from the corresponding storing device to the third lower transport unit 44.

Note that the configuration of the storage unit 3 in the banknote handling apparatus 1 shown in FIG. 4 is an example. The number, arrangement, and the configuration of the storing devices accommodated in a safe housing 131 are not limited to those shown in FIG. 4.

The banknote handling apparatus 1 includes a controller 15. The controller 15 can include a central processing unit (CPU), a memory, and an I/O circuit. The CPU executes programs. The memory stores programs and data for the operation of the banknote handling apparatus 1. The memory is, for example, a random access memory (RAM) and/or a read only memory (ROM). The I/O circuit performs input and output of electrical signals between the controller 15 and the devices connected to the controller 15. The depositing unit 21, the dispensing unit 22, the temporary storage unit 24, the recognition unit 25, the transport unit 4, the first storing device 31, the second storing device 32, the third storing device 33, the fourth storing device 34, the fifth storing device 35, the sixth storing device 36, the seventh storing device 37, the eighth storing device 38, the ninth storing device 39, and the tenth storing device 310 are connected to the controller 15 so as to be capable of exchanging signals with the controller 15. In order to allow for the execution of various processes, the controller 15 controls the depositing unit 21, the dispensing unit 22, the temporary storage unit 24, the recognition unit 25, the transport unit 4, the first storing device 31, the second storing device 32, the third storing device 33, the fourth storing device 34, the fifth storing device 35, the sixth storing device 36, the seventh storing device 37, the eighth storing device 38, the ninth storing device 39, and the tenth storing device 310 are connected to the controller 15.

(Configuration of Sheet Storing Device)

Figure 5:
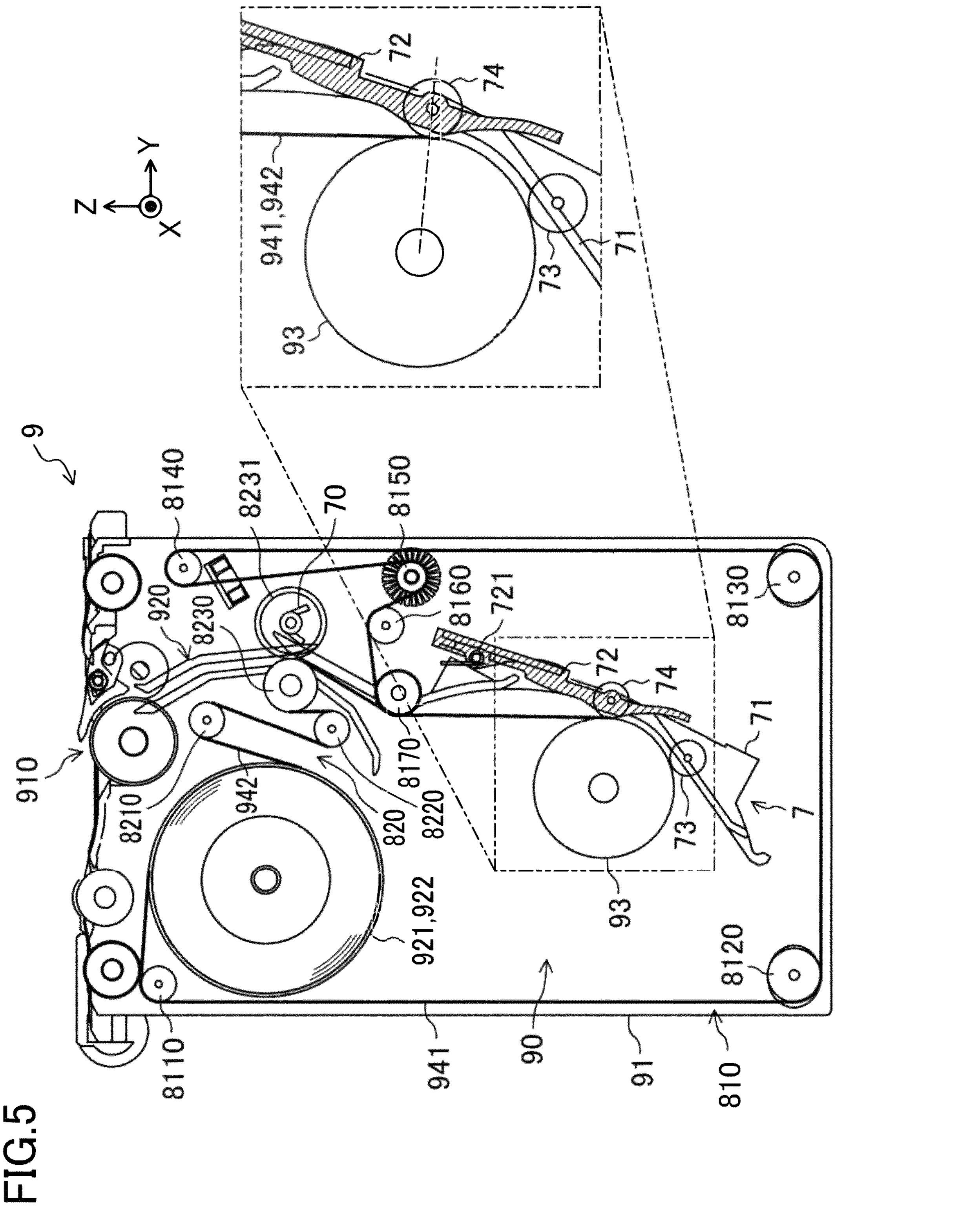
FIG. 5 shows the sheet storing device with the second configuration.
Figure 6:
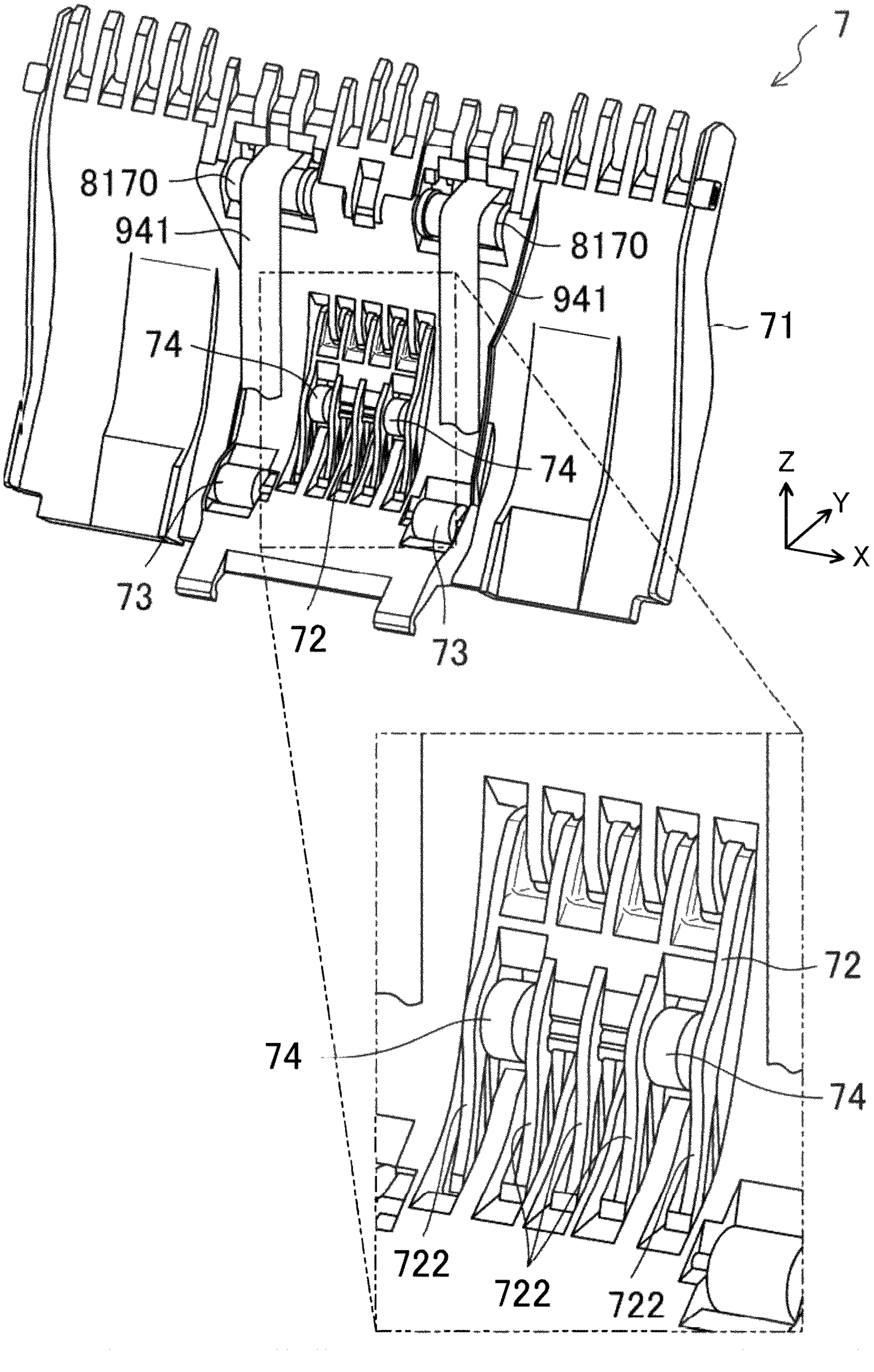
FIG. 6 shows a movable guide.
Figure 7:
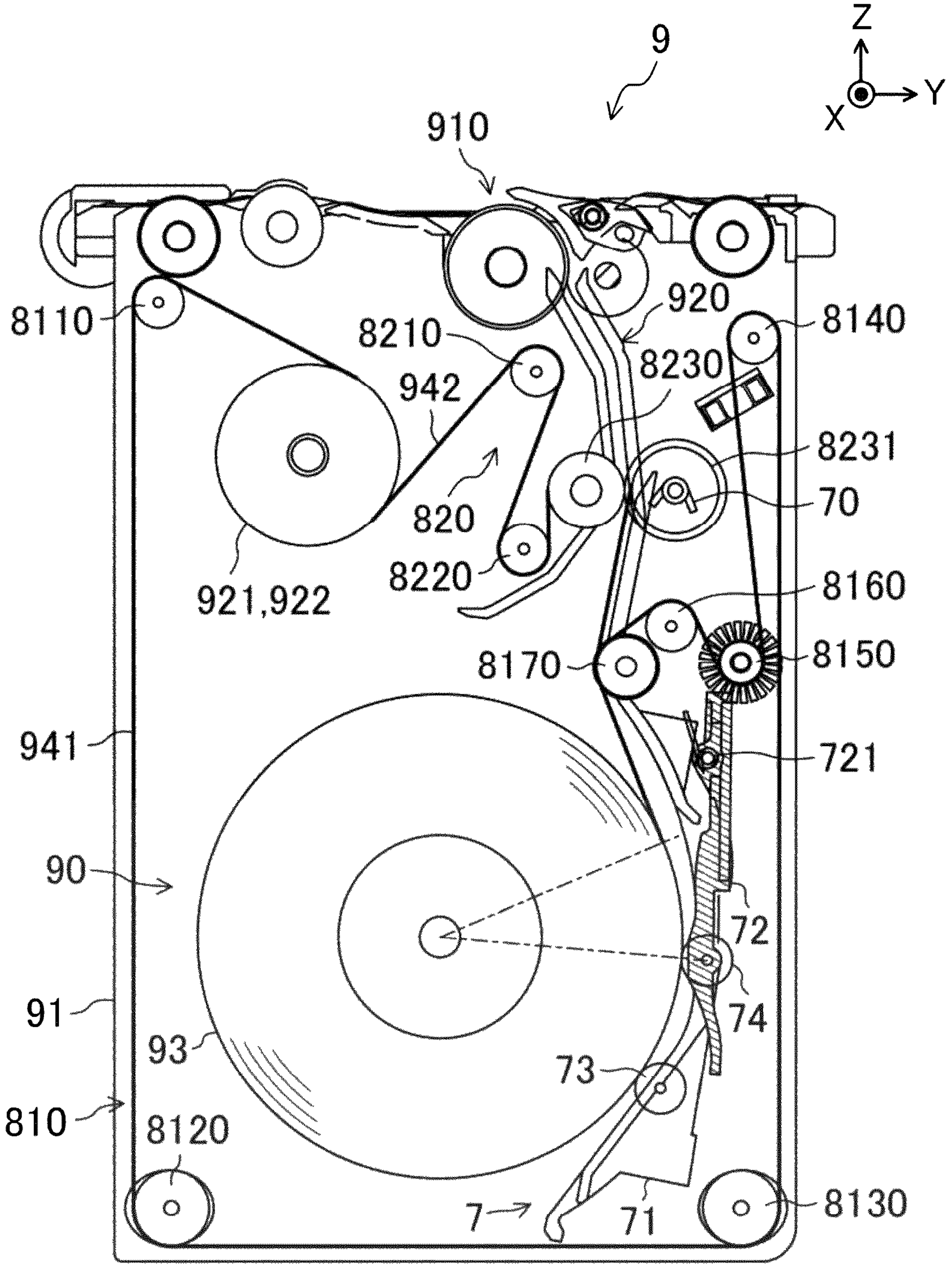
FIG. 7 shows the sheet storing device which is full.

Now, configurations of the first to tenth storing devices 31 to 310 will be described with reference to the drawings. FIGS. 5 to 7 show a configuration of the second storing device 32, for example. The configurations of the first to tenth storing devices 31 to 310 are substantially the same. Hereinafter, the first to tenth storing devices 31 to 310 are collectively referred to as a "banknote storing device 9". The banknote storing device 9 corresponds to the sheet storing device with the second configuration.

FIG. 5 shows the banknote storing device 9 storing no banknote, that is, empty. FIG. 7 shows the banknote storing device 9 storing full of banknotes, that is, full.

The banknote storing device 9 includes a storing mechanism 90 and a frame 91 accommodating the storing mechanism 90. The banknote storing device 9 has, on the upper surface thereof, an opening 910 for taking banknotes in and out.

The storing mechanism 90 winds, on a drum 93, the banknotes sandwiched between the tapes, together with the tapes. The storing mechanism 90 includes two first reels 921, two second reels 922, and the drum 93. Only one reel is shown in FIG. 5. This is because the four reels 921 and 922 in total are shifted along the X-axis and are located at the same positions along the Y- and the Z-axes. Such a reel arrangement is described in detail in Japanese Unexamined Patent Publication No. 2020-047258 (Applicant: GLORY LTD.).

The proximal end of a first tape 941 is fixed to each first reel 921, and the first tape 941 is wound on the first reel 921. The proximal end of a second tape 942 is fixed to each second reel 922, and the second tape 942 is wound around the second reel 922. The distal end of the first tape 941 and the distal end of the second tape 942 are engaged with the outer circumferential surface of the drum 93.

The first tape 941 pulled out from each first reel 921 and the corresponding second tape 942 pulled out from the corresponding second reel 922 are wound in a stacked manner on the outer circumferential surface of the drum 93. The banknotes are sandwiched between the first and second tapes 941 and 942.

The drum 93 rotates in the winding direction of the banknotes and the tapes, and in the feeding direction of the banknotes and the tapes. In the example shown in FIG. 5, the drum 93 winds the banknotes and the tapes in the clockwise direction, and feeds the banknotes and the tapes in the counterclockwise direction.

Here, with no banknote wound thereon, the drum 93 has a relatively small outer diameter. Since the drum 93 has a small diameter with no banknote wound thereon, the banknote storing device 9 can have a large capacity without increasing the size of the frame 91. That is, the increase in diameter of the drum 93 is reduced even when the drum 93 winds a large number of banknotes.

A transport path 920 is formed between the opening 910 and the drum 93. The transport path 920 includes a pair of rollers, a fixed guide member, and a movable guide 7 which will be described later. The banknotes are transported along the transport path 920 in a direction from the opening 910 toward the drum 93 or in a direction from the drum 93 toward the opening 910.

The first tape 941 pulled out from each first reel 921 runs along a first tape path 810 to reach the drum 93. The first tape path 810 includes first tape pulleys 8110, second tape pulleys 8120, third tape pulleys 8130, fourth tape pulleys 8140, fifth tape pulleys 8150, sixth tape pulleys 8160, and seventh tape pulleys 8170. The first tape path 810 goes around the drum 93. Note that there are two first tape pulleys 8110, two second tape pulleys 8120, two third tape pulleys 8130, two fourth tape pulleys 8140, two fifth tape pulleys 8150, two sixth tape pulleys 8160, and two seventh tape pulleys 8170 corresponding to the two first tapes 941.

The axes of rotation of the second and third tape pulleys 8120 and 8130 are each inclined with respect to the X-axis. The first tape 941 pulled out from each first reel 921 is wound on the second and third tape pulleys 8120 and 8130 each having the inclined axis of rotation, whereby its position along the X-axis changes from the position of the first reel 921 to the position of the second reel 922. The first tape 941 is then wound on the corresponding fourth, fifth, and sixth tape pulleys 8140, 8150, and 8160, and reaches the corresponding seventh tape pulley 8170. At this time, the first tape 941 is located at the same position as the corresponding second tape 942 along the X-axis.

The second tape 942 pulled out from each second reel 922 runs along a second tape path 820 to reach the drum 93. The second tape path 820 includes eighth tape pulleys 8210, ninth tape pulleys 8220, tenth tape pulleys 8230, and the seventh tape pulleys 8170. There are also two eighth tape pulleys 8210, two ninth tape pulleys 8220, and two tenth tape pulleys 8230 corresponding to the two second tapes 942.

Each seventh tape pulley 8170 stacks and guides the corresponding first and second tapes 941 and 942 toward the outer circumferential surface of the drum 93. The banknotes are sandwiched between the first and second tapes 941 and 942 at the position of the seventh tape pulley 8170.

In a forward rotation of the drum 93, the banknotes sandwiched between the first and second tapes 941 and 942 are wound on the outer circumferential surface of the drum 93, together with the first and second tapes 941 and 942. The banknote storing device 9 stores the banknotes.

In a reverse rotation of the drum 93, the banknotes sandwiched between the first and second tapes 941 and 942 are fed out from the outer circumferential surface of the drum 93, together with the first and second tapes 941 and 942. Thereafter, the banknotes pass through the transport path 920 and are fed out through the opening 910 to the outside of the banknote storing device 9.

The movable guide 7 guides the first tape 941, the second tape 942, and the banknotes toward the drum 93.

The proximal end, that is, the upper end in FIG. 5, of the movable guide 7 is turnably attached to the frame 91. The movable guide 7 turns about a turning shaft near the contact point between each tenth tape pulley 8230 and a pulley 8231 opposed to the tenth tape pulley 8230. The turning shaft is fixed to the frame 91. The movable guide 7 is biased in the clockwise direction in FIG. 5 by a torsion spring 70. As shown in FIGS. 5 and 7, The movable guide 7 turns in the clockwise direction and in the counterclockwise direction, in accordance with the size of the diameter of the drum 93.

FIG. 6 illustrates the movable guide 7. The movable guide 7 includes a main body 71 and a swing member (second swing member) 72. The main body 71 is in a plate shape expanding in the X- and Z-directions. As described above, the upper end of the main body 71 is pivotally supported by the turning shaft fixed to the frame 91.

The seventh tape pulleys 8170 are attached to upper portions of the main body 71. While being spaced apart from each other in the X-direction, the two seventh tape pulleys 8170 are attached to the main body 71. The distance between the two seventh tape pulleys 8170 corresponds to the distance between the two first tapes 941.

Second pressing members 73 are attached to lower portions of the main body 71. The second pressing members 73 are each a roller that rotates about an axis (i.e., axis of rotation) extending along the X-axis. Two second pressing members 73 are attached to the main body 71. The distance between the two second pressing members 73 corresponds to the distance between the two first tapes 941. As shown in FIG. 5 or 7, each second pressing member 73 presses, against the drum 93, the first and second tapes 941 and 942 wound on the drum 93 and the banknotes sandwiched between the first and second tapes 941 and 942. Accordingly, the second pressing members 73 increase the adhesion among the first tapes 941, the second tape pulleys 8120, and the banknotes. The drum 93 can stably wind the first and second tapes 941 and 942 and the banknotes.

Each second pressing member 73 abuts on the outermost point of the drum 93, whereby the movable guide 7 turns with an increase in diameter of the drum 93. More specifically, the movable guide 7 is biased in the clockwise direction in FIG. 5 by the torsion spring 70. With an increase in the diameter of the drum 93, the movable guide 7 turns in the counterclockwise direction as shown in FIG. 7. Even with a change in the diameter of the drum 93, the movable guide 7 can guide the first and second tapes 941 and 942 and the banknotes to the drum 93.

The swing member 72 is attached to a central portion of the main body 71. More specifically, the swing member 72 is interposed between the seventh tape pulleys 8170 and the second pressing members 73 and between the two first tapes 941. As shown in FIG. 5, the swing member 72 is in a plate shape extending substantially vertically and has an upper end pivotally supported with respect to the main body 71. The pivot shaft of the swing member 72 is shifted from the pivot shaft of the main body 71 of the movable guide 7. Accordingly, the swing member 72 can swing together with the main body 71 and in addition, separately from the main body 71 in a direction toward and away from the drum 93. A torsion spring 721 as a biasing member is attached to the pivot point of the swing member 72. The torsion spring 721 biases the swing member 72 in the clockwise direction in FIG. 5.

Rollers 74 are attached to a central portion of the swing member 72. The rollers 74 press the banknotes wound on the drum 93 against the outer circumferential surface of the drum 93. The rollers 74 each serve as the first pressing member. The rollers 74 are attached to the swing member 72 so as to rotate about an axis extending along the X-axis. The swing member 72 supports the rollers 74.

While being spaced apart from each other along the X-axis, two rollers 74 are attached to the swing member 72. Since the swing member 72 is interposed between the two first tapes 941 (and the second tapes 942), the two rollers 74 are also interposed between the two first tapes 941 (and the second tapes 942). In other words, the two rollers 74 are shifted along the X-axis with respect to the two first tapes 941 and the two second tapes 942.

The movable guide 7 and the swing member 72 are biased by the torsion spring 70 and the torsion spring 721, respectively, whereby the rollers 74 abut on the outer circumferential surface of the drum 93. Once the drum 93 rotates, the rollers 74 also rotate.

As described above, the second pressing members 73 also abut on the outer circumferential surface of the drum 93. As shown in FIG. 5 or 7, each roller 74 and the corresponding second pressing member 73 are shifted along the circumference of the drum 93. More specifically, with reference to the running direction of the first and second tapes 941 and 942 being wound on the drum 93, each roller 74 is located upstream of the corresponding second pressing member 73 in the running direction of the first and second tapes 941 and 942.

The rollers 74 are supported by the swing member 72 and the second pressing members 73 are supported by the movable guide 7, whereby both the rollers 74 and the second pressing members 73 can always abut on the outer circumferential surface of the drum 93, even with a change in the diameter of the drum 93.

As shown in an enlarged view of FIG. 5, each roller 74 is located at a starting point at which the first and second tapes 941 and 942 to be wound on the drum 93 first come into contact with the drum 93 (see the dot-dashed line). The roller 74 can press, against the drum 93, a portion of each banknote, which is wound on the drum 93 together with the first and second tapes 941 and 942, not pressed by the first and second tapes 941 and 942. This reduces the bulge of the portion of the banknote not pressed by the first and second tapes 941 and 942 in a direction away from the drum 93. The roller 74 may be located near the starting point, at which the first and second tapes 941 and 942 to be wound on the drum 93 first come into contact with the drum 93.

Here, as shown in FIG. 7, with an increase in the number of banknotes wound on the drum 93, the positional relationship between the starting point and each roller 74 is reversed (see the dot-dashed line). That is, the roller 74 is located downstream of the starting point in the running direction of the tape. In this state, the effect of the rollers 74 reducing the bulge of each banknote decreases. However, as described above, the bulge of a banknote becomes a problem, when the number of banknotes wound on the drum 93 is small. When the number of banknotes wound on the drum 93 and the outer diameter of the drum 93 increases, the bulge of each banknote can be reduced because the curvature of the banknotes becomes smaller. No disadvantage is caused by the roller 74 located downstream of the starting point in the running direction of the tape. When the number of banknotes wound on the drum 93 is less than a predetermined number, the roller 74 is located at or near the starting point. When the number of banknotes wound on the drum 93 is the predetermined number or more, the roller 74 is located downstream of the starting point in the running direction of the tape at the time when the tape is wound on the drum 93.

As shown in an enlarged view of FIG. 6, a plurality of ribs 722 are integrally formed in the swing member 72. The ribs 722 are located between the two rollers 74 and on the sides of the rollers 74. Each rib 722 extends along the Z-axis in the running direction of the tape. The plurality of ribs 722 are aligned at intervals along the X-axis. The rollers 74 directly abut on the banknotes and press the banknotes against the drum 93. For example, when a banknote with a broken part passes through the rollers 74, the ribs 722 interfere with the part of the banknote. Accordingly, less banknote is caught in the rotating rollers 74. The ribs 722 reduce the jam of banknotes.

(Variations of First Pressing Member)

Figure 8A:
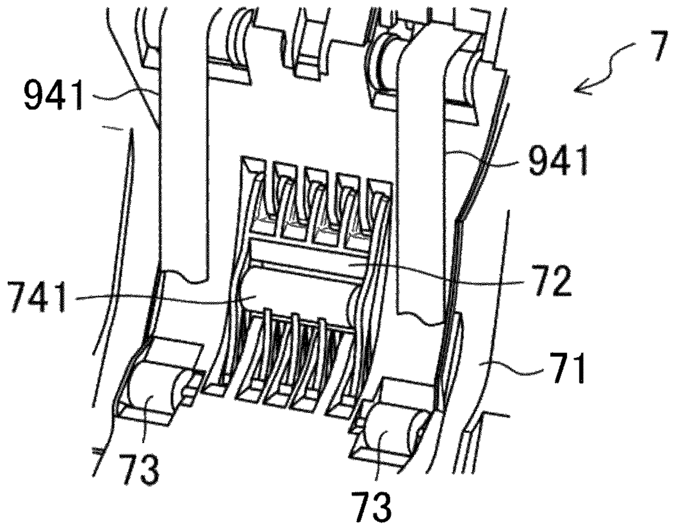
FIGS. 8A, 8B, and 8C each show a variation of the first pressing member.

FIG. 8 shows variations of the first pressing member. As shown in FIG. 8A, the first pressing member may be a wide roller 741 that is long along the axis of rotation. The wide roller 741 can press a wide area of the central portion of each banknote against the drum 93.

Figure 8B:
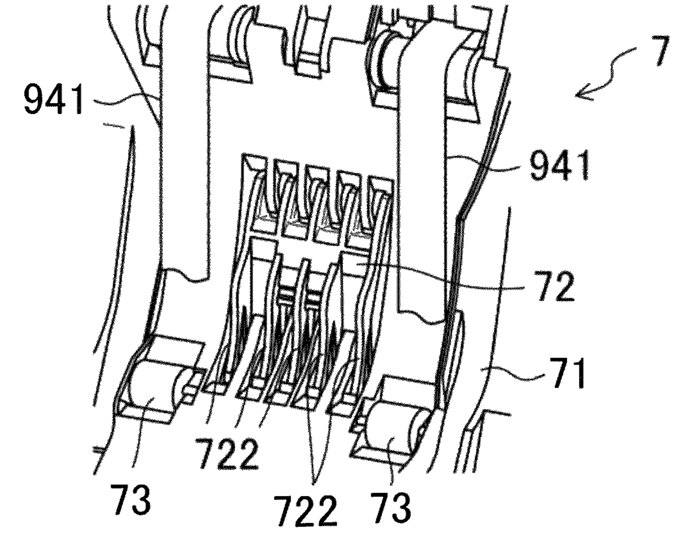

As shown in FIG. 8B, the first pressing member may be the ribs 722 of the swing member 72. That is, the first pressing member is not limited to a roller.

Figure 8C:
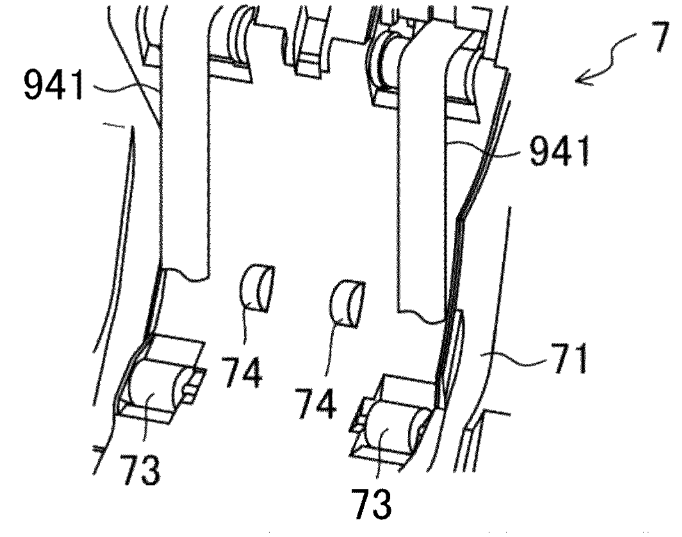

As shown in FIG. 8C, the rollers 74 each serving as the first pressing member may be directly attached to the movable guide 7. As described above, the rollers 74 can always abut on the drum 93 by being attached to the swing member 72. In the case where the rollers 74 are directly attached to the movable guide 7, if the diameter of the drum 93 increases, the rollers 74 may be apart from the drum 93 while the second pressing members 73 abut on the drum 93. With an increase in the diameter of the drum 93, the effect of the rollers 74 reducing the bulge of each banknote becomes unnecessary. There is thus no or less inconvenience even if the rollers 74 are away from the drum 93.

Note that the first pressing member may be attached to be displaceable with respect to the movable guide 7.

Figure 9:
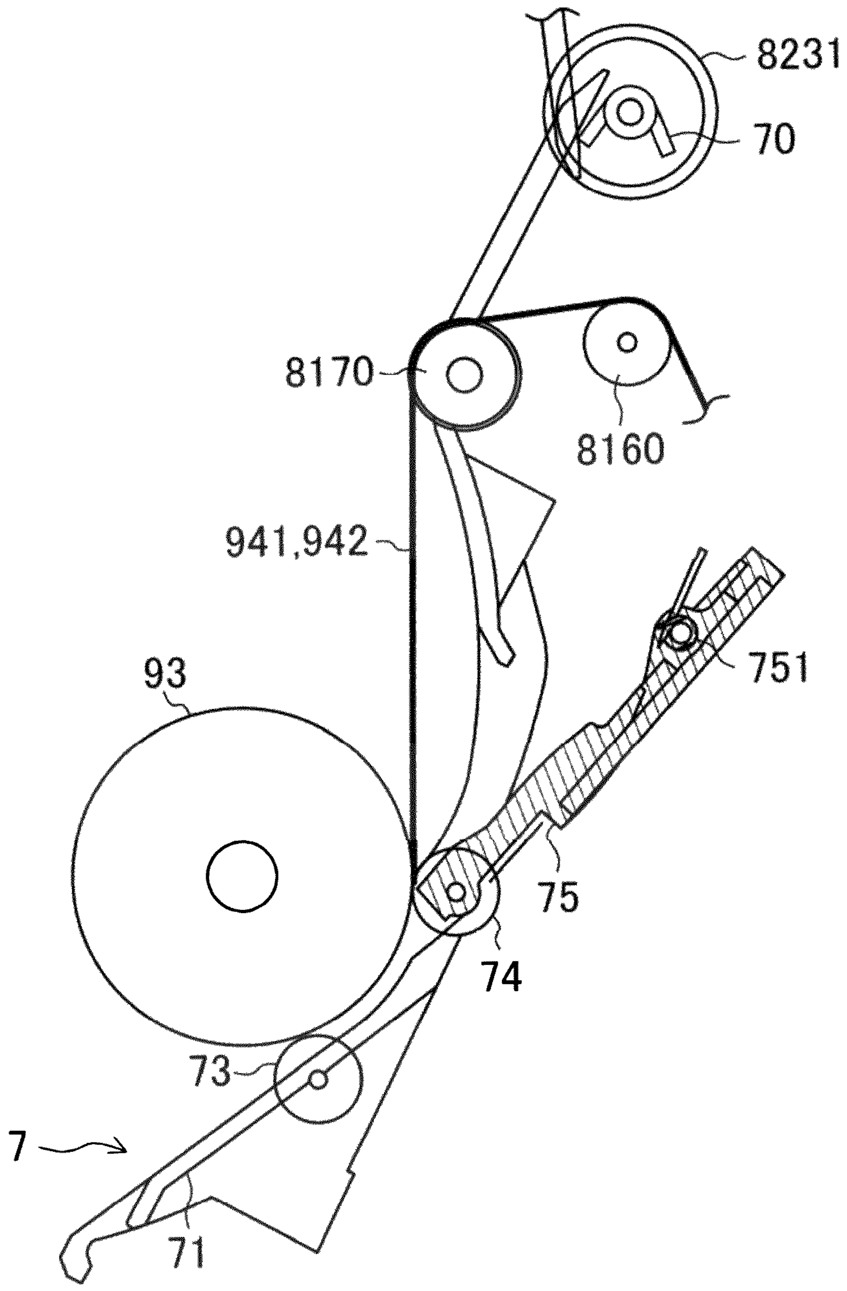
FIG. 9 shows a second swing member.

FIG. 9 shows still another variation of the first pressing member. In the configuration example of FIG. 9, a roller 74 is supported by a second swing member 75 independent of the movable guide 7. Similarly to the (first) swing member 72 described above, the second swing member 75 is in a plate shape extending substantially vertically and has the upper end pivotally supported with respect to the frame 91 of the banknote storing device 9. Accordingly, the second swing member 75 can swing independently of the movable guide 7. A torsion spring 751 as a biasing member is attached to the pivot of the second swing member 75. The torsion spring 751 biases the second swing member 75 in the clockwise direction in FIG. 9.

With this configuration as well, the roller 74 can always abuts on the drum 93. In addition, the position of the movable guide 7 can be changed in accordance with a change in the diameter of the drum 93.

(Power Management of Banknote Handling Apparatus)

The banknote handling apparatus 1 executes various processes related to banknotes. The banknote handling apparatus 1 switches between a normal mode and a power saving mode. In the normal mode, the banknote handling apparatus 1 supplies power to all the sensors and actuators. In the power saving mode, if no process is performed for a certain period of time, the banknote handling apparatus 1 turns off the power supply to all the sensors and actuators at once.

In addition to this, the banknote handling apparatus 1 disclosed herein individually turns off the power supply to the sensors and actuators that are not used to execute certain processes. Accordingly, the banknote handling apparatus 1 achieves further power saving.

Figure 10:
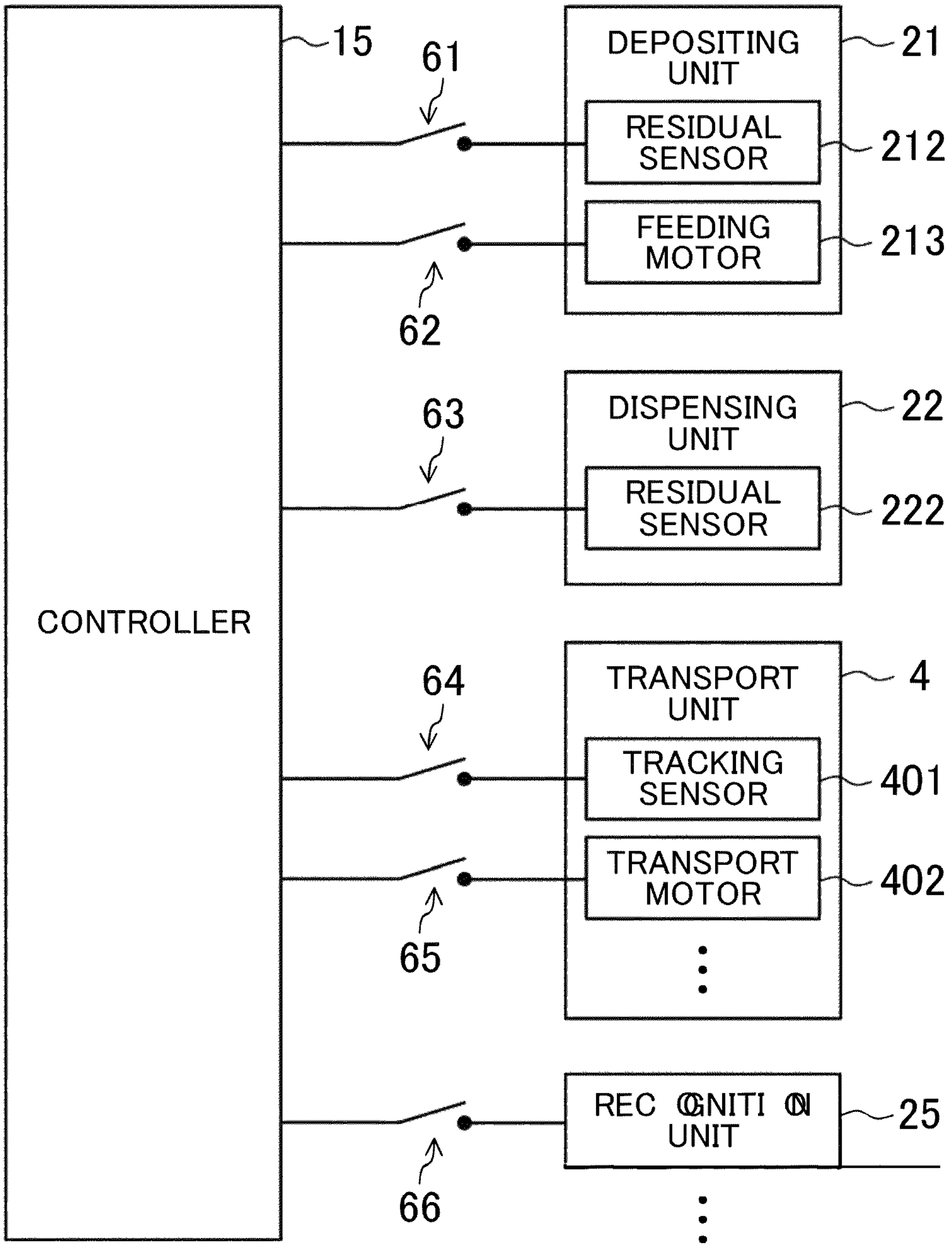
FIG. 10 shows a control configuration of the sheet handling apparatus.

FIG. 10 illustrates a configuration related to the power supply in the banknote handling apparatus 1. As described above, the banknote handling apparatus 1 includes a depositing unit 21, a dispensing unit 22, a transport unit 4, a recognition unit 25, and the like. Each unit includes a sensor(s) and/or an actuator(s). For example, the depositing unit 21 includes a residual sensor 212 that detects banknotes remaining in the depositing unit 21, and a feeding motor 213 that feeds banknotes from the depositing unit 21 to the banknote handling apparatus 1. The dispensing unit 22 includes a residual sensor 222. The transport unit 4 includes a tracking sensor 401 that is placed on the transport path and detects passing banknotes, and a transport motor 402 for transporting the banknote. The recognition unit 25 includes an optical sensor and a magnetic sensor for detecting the characteristics of the banknotes, and a thickness sensor for detecting the thicknesses of the banknotes. In addition, the sensors in the banknote handling apparatus 1 include an opening and closing sensor that detects the opening and closing of a door of the safe unit 13, an attachment and detachment sensor that detects the attachment and detachment of the storing devices 31 to 310, and other suitable sensors. In addition, the actuators in the banknote handling apparatus 1 include rotary solenoids at branch points of the transport path, a driving motor that transports banknotes in the storing devices 31 to 310, and the like.

The banknote handling apparatus 1 includes switches 61 to 66 individually for the sensors and actuators. The controller 15 can individually switch the power supply to the sensors and actuators by individually turning on and off the switches 61 to 66.

For example, in the depositing process, banknotes are sent from the depositing unit 21 to the temporary storage unit 24, that is, not to the safe unit 13. The controller 15 thus stops the power supply to the sensors and actuators of the units in the safe unit 13.

For example, since the storing device that stores the banknotes not to be dispensed does not feed out the banknotes in the dispensing process, the power supply to the sensor and the actuator of the storing device is stopped.

The banknote handling apparatus 1 allows for most suitable power management.

What is claimed is:

1. A sheet storing device, comprising:

a rotary drum;

at least one tape to be wound on an outer circumferential surface of the rotary drum so as to wrap a sheet around the rotary drum;

at least one first pressing member that is shifted from the at least one tape along an axis of the rotary drum and presses the sheet against the outer circumferential surface of the rotary drum; and a movable guide that is displaced in accordance with a change in a diameter of the rotary drum and guides, to the rotary drum, the tape and the sheet to be wound on the rotary drum, wherein the at least one first pressing member presses the sheet against the rotary drum at or near a starting point at which the at least one tape to be wound on the rotary drum first comes into contact with the rotary drum, and the movable guide supports the at least one first pressing member to be displaceable with respect to the movable guide in directions toward and away from the rotary drum.

2. The sheet storing device of claim 1, wherein the at least one first pressing member presses the sheet against the rotary drum at the starting point or at a point upstream of the starting point in a running direction of the at least one tape being wound on the rotary drum.

3. The sheet storing device of claim 1, wherein at least when a first sheet is wound on the rotary drum, the at least one first pressing member presses the first sheet against the rotary drum at or near the starting point.

4. The sheet storing device of claim 1, wherein the at least one first pressing member presses the sheet against the rotary drum at a point downstream of the starting point in the running direction of the at least one tape being wound on the rotary drum with a predetermined number or more of sheets wound on the rotary drum.

5. The sheet storing device of claim 1, wherein the at least one tape includes:

a first tape; and a second tape to be wound on the outer circumferential surface of the rotary drum with a shift from the first tape along the axis, and the at least one first pressing member is interposed between the first tape and the second tape aligned along the axis.

6. The sheet storing device of claim 5, wherein a plurality of first pressing members are interposed between the first tape and the second tape aligned along the axis.

7. The sheet storing device of claim 1, wherein the at least one first pressing member is located more outward than the at least one tape along the axis on the rotary drum.

8. The sheet storing device of claim 1, wherein the at least one first pressing member is a roller that comes into contact with the outer circumferential surface of the rotary drum and is to be rotated by the rotary drum.

9. A sheet storing device, comprising:

a rotary drum;

at least one tape to be wound on an outer circumferential surface of the rotary drum so as to wrap a sheet around the rotary drum;

at least one first pressing member that is shifted from the at least one tape along an axis of the rotary drum and presses the sheet against the outer circumferential surface of the rotary drum;

a movable guide that is displaced in accordance with a change in a diameter of the rotary drum and guides, to the rotary drum, the tape and the sheet to be wound on the rotary drum; and a first swing member attached to the movable guide so as to be swingable with respect to the movable guide in directions toward and away from the rotary drum, wherein the first swing member supports the at least one first pressing member.

10. The sheet storing device of claim 1, further comprising:

a second pressing member that presses, against the rotary drum, the tape wound on the rotary drum.

11. The sheet storing device of claim 10, wherein the at least one first pressing member and the second pressing member are shifted from each other along a circumference of the rotary drum.

12. The sheet storing device of claim 1, further comprising:

a second pressing member that presses, against the rotary drum, the tape wound on the rotary drum, wherein the movable guide supports the second pressing member.

* * * * *